United States Patent [19]

Poliniak et al.

[11] 4,376,087

[45] Mar. 8, 1983

[54] PROCESSING OF VIDEO DISCS

[75] Inventors: Eugene S. Poliniak, Willingboro; Pabitra Datta, Cranbury, both of N.J.

[73] Assignee: RCA Corporation, New York, N.Y.

[21] Appl. No.: 266,986

[22] Filed: May 26, 1981

[51] Int. Cl.³ .............................................. B29D 17/00
[52] U.S. Cl. ..................................... 264/107; 264/233
[58] Field of Search ....................... 264/106, 107, 233

[56] References Cited

U.S. PATENT DOCUMENTS 3,882,214  5/1975  Nosker ................................ 264/106
4,228,050 10/1980  Martin et al. .................. 260/23 XA
4,275,100  6/1981  Datt .................................. 264/107 X

*Primary Examiner*—Thomas P. Pavelko
*Attorney, Agent, or Firm*—Birgit E. Morris; Howard F. VanDenburgh

[57] ABSTRACT

High density information discs, such as video discs, which have been treated with a fluorinating agent become resistant to and stable under conditions of high temperature and high relative humidity, even after exposure to such conditions for extended periods of time. The treatment with the fluorinating agent is accomplished by use of a bath of an aqueous solution of a "soft" fluorinating reagent, such as fluorosilicic acid or fluoroboric acid.

14 Claims, No Drawings

PROCESSING OF VIDEO DISCS

This invention relates to the manufacture of high density information discs, also known as video discs. More particularly, this invention pertains to the improved manufacture and processing of such discs to improve their storage stability, and particularly their stability or resistance to conditions of high temperature and high relative humidity.

BACKGROUND OF THE INVENTION

Martin et al., in U.S. Pat. No. 4,228,050, have disclosed an improved molding composition for the compression molding of high density information discs, also known as video discs. This molding composition is a conductive molding composition, containing sufficient conductive carbon black particles to obtain the desired conductivity (bulk resistivity below about 500 ohm-cm at 900 megahertz), along with other desired additives such as stabilizers, lubricants, plasticizers, and processing aids. The remainder of the conductive molding composition is a polyvinylchloride based resin, and the composition has the proviso that not more than about 5 percent by weight of liquid additives are present therein. Molded articles, such as high density information disc replicas, molded from this improved conductive molding composition are said to be dimensionally stable and possess improved resistance to the effects of changes in environmental temperatures and humidity.

However, we have found that the stability of these discs with respect to environmental fluctuations of temperature and relative humidity have been less than satisfactory. Discs which on initial playback have excellent or acceptable playback characteristics, deteriorate with respect to playback after storage under ambient conditions. This deterioration is particularly marked when the discs are exposed to conditions of high temperature and high relative humidity.

Huck et al. in copending application Ser. No. 091,878, filed Nov. 7, 1979, and entitled "VIDEO DISC PROCESSING" have disclosed that high density information discs which have been cleaned with an aqueous solution have improved stability of playback characteristics to changing environmental conditions. The use of water alone or dilute solutions of acids or bases are shown to remove water soluble metal salts and other water soluble materials, such as certain organic impurities, on the surface of the disc, which materials contribute to the moisture sensitivity of the disc.

Datta, in copending application Ser. No. 109,206, filed Jan. 4, 1980, entitled "VIDEO DISC PROCESSING", has disclosed that an aqueous solution comprising an oxidizing agent, a base, and a sufficient amount of a fluorosurfactant which will produce a solution having a surface tension below about 35 dynes/cm$^2$ is an excellent cleaning solution for high density information discs. It has been shown that by the use of this aqueous cleaning solution, metal salts including calcium, barium, nickel, lead, and tin salts, sulfur compounds, and organic compounds, such as esters, which are originally present on the surface of the disc are removed from the disc surface, thereby lessening its sensitivity to moisture.

However, upon exposure to conditions of elevated temperature and relative humidity for extended periods of time, the discs deteriorate such that their playback characteristics are no longer excellent and in some cases are not even acceptable. Thus, the search has continued for better disc materials and processing to improve the stability of high density information discs to conditions of high temperature and high relative humidity, particularly exposure to such conditions for extended time periods.

SUMMARY OF THE INVENTION

We have found that by treating high density information discs, such as video discs, with a fluorinating agent, the discs become resistant to, and stable under, conditions of high temperature and high relative humidity, even after exposure to such conditions for extended periods of time. The treatment with the fluorinating agent is usually accomplished by use of a bath of an aqueous solution of the fluorinating agent. The fluorinating agents employed are "soft" fluorinating reagents, such as fluorosilicic acid and fluoroboric acid.

DETAILED DESCRIPTION OF THE INVENTION

The high density information discs treated in accordance with the present invention are molded from a molding composition comprising a polymer of vinyl chloride; finely-divided conductive carbon black particles; a stabilizer system which is generally a mixture of tin salts that scavenge or take up hydrochloric acid formed as a decomposition product of the vinyl chloride polymer during processing; a lubricant system which generally is composed of both an internal lubricant, to modify the melt viscosity of the molding composition during processing, and an external lubricant, to provide release of the molded article, such as a video disc, from the mold; and a flow modifier system which is generally composed of plasticizers and processing aids to reduce the melt viscosity of the molding composition during the processing.

When large amounts of conductive particles, such as carbon black, are present in a molding composition, the melt viscosity greatly increases necessitating higher molding temperatures or larger amounts of plasticizers and processing aids. Since the present carbon-loaded polyvinylchloride molding compositions employed for the video disc contain from about 12 up to about 20 percent by weight of carbon black or even higher, depending on the type of carbon black used and the dispersion obtainable, several processing aids and plasticizers must be added to obtain the melt flow properties required to compression mold the information disc, which contains information as very small surface relief patterns in a very shallow information track. Sufficient lubricants must be added to promote ready release of the molded article from the mold because any release problems will result in distortion of the record during forced release, and even distortion of the stamper from which it is molded, which ruins all succeeding discs made from that stamper.

The polyvinylchloride (PVC) resins suitable for manufacture of the video discs include polymers and copolymers of vinyl chloride or mixtures thereof. In order to produce desired characteristics in the molded video disc, such as dimensional stability, the PVC resin should have a high heat distortion temperature, preferably 140° F. (60° C.) or higher. Suitable polymers include homopolymers of vinyl chloride, such as No. 346 resin of the B. F. Goodrich Co. which has a $T_g$ of 88° C., or a copolymer of vinyl chloride/propylene such as AP480 of the Air Products and Chemicals Inc. which has a $T_g$ of 76° C.

Conductive particles suitable for use in the molding composition include highly electrically conductive, finely-divided carbon blacks, preferably which have a low bulk density to reduce loading requirements. A presently preferred product is one of the Armak Co., Ketjenblack EC, which has an apparent bulk density of about 140–160 grams per liter and an average particle size of about 300 angstroms. Other carbon blacks can also be employed, in whole or in part, provided they meet the electrical requirements. Denser particles of carbon will generally require higher loading, e.g. up to about 40 percent by weight of the molding composition in order to obtain an equivalent electrical conductivity. An amount of from about 12–20 percent by weight of a carbon black such as Ketjenblack EC is preferred.

Stabilizers, in an amount of from about 1.5–4 percent by weight, are added to the chosen PVC—carbon black composition. Suitable stabilizers include organotin compounds such as dibutyltin-$\beta$-mercaptopropionate, commercially available as T-35 from M & T Chemical Co., Inc., dibutyltin maleate, commercially available as Mark 275 Argus Chemical Co., and stabilizers such as barium-cadmium-lead stearate, commercially available as Q-232B of Argus Chemical Co. These stabilizers, as well as others which are known and may be used, act primarily to scavenge volatile decomposition products of the PVC resin, particularly hydrogen chloride. Preferably a combination of more than one stabilizer in a particular molding composition is employed.

Lubricants which are suitable for use with PVC resins are well-known and include fatty acids and esters of alcohols and fatty acids, soaps, fatty acids amides and the like. Again, a combination of at least two lubricants should be used to prevent excessive bleed out of the lubricant during the molding process and to provide both internal and external lubrication. Suitable lubricants include a mixture of a monofatty acid ester of varying molecular weight alcohols and acids, commercially available as Loxiol G-30 from Henkel International GmbH, Loxiol G-70, a polyfunctional complex ester of saturated fatty acids, a room temperature solid esterified montan wax commercially available as Wax E of the Hoechst Co., calcium, zinc, or lead stearates, stearic amide, oleamide, ethylene bis stearamides, low molecular weight paraffin oils such as Olio di Vasilina from Carlo ERBA, a division of Chemica Industrialle, Milan, and the like. Sufficient lubricants must be added to prevent high shear heating during processing and to provide good release from the mold. Generally from about 1 to 3 percent by weight of the molding composition of a lubricant system will be used.

Additional modifiers including plasticizers and processing aids in amounts up to about 10 percent by weight of the resin composition are also added to improve the processing and molding characteristics of the resin composition. Suitable plasticizers include products such as chlorinated paraffin waxes, for example Unichlor 70AX from Neville Chemical Co., glyceryl tri-benzoate, commercially available as Benzoflex S-404 from Velsichol Chemical Corp., epoxicized soybean oils, commercially available as Paraflex G-62 from Rohm and Haas Co., Santicizer 711, a primary phthalate plasticizer of the Monsanto Company, Kodaflex NP10, a polymeric ester plasticizer from Eastman Chemical Products, dicyclohexylphthalate and various processing aids such as acrylic modifiers of Rohm and Haas Co., commercially available as K-147 and K-175. Other modifiers which can be employed are well-known.

The total amount of liquid modifiers used must be carefully controlled, and likewise, these modifiers must be compatible with the vinyl chloride resin so that they will not bleed to the surface and create staining. Solid modifiers can be compatible or incompatible. Compatible modifiers have a much greater effect on the shrinking and heat distortion temperature for the resin composition, whereas incompatible modifiers act more like fillers and have less effect on these properties. A certain amount of compatible modifiers must be present for processability and to overcome the stiffening effect of the large amount of conductive carbon particles in the resin; however, if too much liquid is added, i.e. more than about 5 percent by weight of the resin composition, the $T_g$ and heat distortion temperature of the molding composition are reduced and the warpage and shrinkage characteristics of the molded record will be undesirably high. A liquid modifier is defined as a material that is liquid at room temperature. However, solid, low melting primary plasticizers may also behave as liquids at mixing temperatures and then they are also considered to be included as liquid modifiers.

A presently preferred molding composition for use in making conductive video discs comprises from 12–20 percent by weight of the molding composition of Ketjenblack EC conductive carbon particles; from 1–3 percent by weight of dibutlytin-$\beta$-mercaptopropionate stabilizer; up to 2 percent by weight of a tin maleate stabilizer; from 0.25–1.5 percent by weight of Loxiol G-30 lubricant; from 0.15–0.75 percent by weight of Loxiol G-70 lubricant; up to 1 percent by weight of calcium stearate lubricant; up to 5 percent by weight of acrylic processing aids; a maximum of about 4 percent by weight of liquid additives and no more than 10 percent by weight of solid additives, with the remainder of the composition being a polyvinylchloride homopolymer or copolymer of vinyl chloride/propylene having a $T_g$ of over 60° C.

This molding composition can be prepared by mixing all of the solid ingredients first in a blender, such as a Henschel mixer until the temperature reaches about 120° F. (49° C.), and then adding the liquid ingredients which coat the solid particles. Mixing is thereafter continued until the temperature reaches about 160° F. (71° C.). The composition is then collected and charged to a Banbury mixer or other suitable apparatus to melt the ingredients under shear. The composition is mixed until it is molten, about 350°–380° F. (176°–190° C.), and then extruded and pelletized for storage. Video disc replicas can be made by compression molding in conventional manner, e.g. forming a preform, compression molding using a 30–60 second cycle at about 325°–380° F. (163°–190° C.) and thereafter removing the flashing.

A thin lubricant coating is usually added to the video disc. This film serves as an added dielectric layer at the surface and also serves to reduce stylus wear during playback of the disc. One lubricant type that has been employed successfully is a methylalkylsiloxane of the formula:

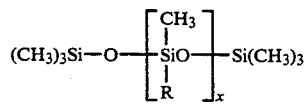

wherein R is an alkyl group of 4–20 carbon atoms and x is an integer. These lubricants can be applied by spinning or spraying from solution or evaporating onto the disc surface. An improved lubricant is a purified fractionated lubricant of the above type wherein R is 10 and x ranges from 2–3. The purified lubricant can be made by molecular distillation of the higher molecular weight material. The lubricant and method of manufacture are described by Wang et al. in their copending applications, Ser. Nos. 065,064 and 065,065, filed Aug. 9, 1979.

During compression molding of the video disc, many of the above additives, or reaction products of these additives including decomposition or reaction products of the additives with the PVC or with each other, migrate to the surface of the disc where they form a thin film. This thin film is a complex mixture of various organic and inorganic materials. It is this thin film which is sensitive to moisture and conditions of high temperature and high humidity, all of which cause problems in the playback of the video disc.

When a disc as pressed is exposed to the conditions of the atmosphere, small droplets of water condense on the surface of the disc. Any salts or other water soluble materials that are present on the surface of the disc, whether under or adjacent to the water droplets, are dissolved by the water droplets. The water droplets may also dissolve water soluble materials below the surface of the disc, such as by a wicking or leaching effect. As this water evaporates, salts are left on the surface of the disc, not now as a uniform thin film, but as lumps or deposits. These deposits may cover several information tracks and they may fill up the information pattern as well. Thus, the information present in the track beneath the deposits is masked or lost during playback by the stylus, which rides over the deposits resulting in a loss of signal or dropout of the audio, video, and/or color information in that area. Additional signal losses occur because the stylus may dislodge some of these deposits during playback, and they may collect beneath or in front of the stylus which results in further distortion or losses of the signal.

The distortion, loss of signal, or dropout of the audio, video, and color information is measured and reported as carrier distress time. The present standard, or pass criteria, for such loss of signal or dropouts for an acceptable video disc is a maximum of 3 seconds in 60 minutes of playback time, and good quality is considered to be less than 0.3 second in 1 hour of playback time. The carrier distress time is measured by adding the amount of time in seconds (but discounting intervals of less than 10 microseconds) when the r.f. output of the player arm is less than 150 millivolts peak to peak (reference d to a one volt reference level) and the time when the r.f. output is above 8.6 megahertz or below 3.1 megahertz in frequency, indicating a defect. Such defects are noted by the viewer as long dropouts, up to a complete loss of picture and sound information.

We have found that by treating these discs with a fluorinating agent, in particular, a "soft" fluorinating reagent, the discs become resistant to atmospheric conditions, particularly atmospheric conditions of high moisture content, and furthermore become stable under conditions of high temperature and high relative humidity. Additionally, the so-treated discs maintain their original low level of carrier distress, less than 3 seconds in 60 minutes of playback time, after repeated exposure to conditions of high temperature and high relative humidity for prolonged periods of time.

The fluorinating agents useful in the treating method of this invention are identified as "soft" fluorinating reagents, such as fluorosilicic acid, fluoroboric acid, hydrofluoric acid, antimony pentafluoride, and the like. These and other soft fluorinating agents, under normal conditions, do not cause fragmentation of the functional groups, neither do they saturate double bonds, nor do they oxidize metals to their highest valency. However, in lieu thereof, these soft fluorinating agents under normal conditions convert groups such as RCOOH, RCOH, and ROH to $RCF_3$, $RCH_2$, and RF, respectively. It has been found that these types of polar groups are present on the surfaces of the video discs formed by compression molding, as hereinabove described, and originate from the carbon black and the thermal decomposition products of the PVC and other additives and modifiers employed in molding these video disc replicas. Also, it is believed that these types of soft fluorinating agents help to convert the hydroscopic chloride salts, such as calcium and barium chloride, to moisture insensitive fluoride salts, such as calcium and barium fluoride. For best results, we have found that these soft fluorinating reagents should be used in an aqueous treatment bath in amounts of from about 1 up to about 40 percent by weight based on the total weight of the treatment bath, and preferably in amounts of from 2 to 10 weight percent of the soft fluorinating agent.

The discs can be treated by immersing in the treating solution, or by spraying and the like. The solution can be agitated to improve the treatment of the disc, as by mechanical stirring, or ultrasonic agitation and the like. A turbulent type of action of the treating solution can also be directed at the surface of the disc, if desired, to aid in the treating of the disc. Multiple immersions of the disc in the treating solution can be employed and a final rinse with purified water can also be beneficially used. After treating with the solution, the discs may be air or solvent dried.

The following specific examples are included in order to illustrate the invention and the improvement thereof with greater particularity. However, it is to be understood that these examples are not intended to limit the invention in any way.

EXAMPLE I

In this example a series of video discs were compression molded from a molding composition containing 75.15 parts of the PVC resin 346 referred to above, 14.8 parts of Ketjenblack EC carbon particles, 1.5 parts of T35 and 1.0 part of Mark 275 as stabilizers, 0.75 part of G-30, 0.25 part of G-70, 0.5 part of calcium stearate, and 0.3 part of Olio di Vasilina as lubricants, 0.75 part of K-175 processing aid, 2.0 parts of K-147 processing aid, and 3.0 parts of Santicizer 711 modifier. The discs were compression molded from this composition at a temperature of about 360° F. (182.2° C.).

The discs from this press run were divided into three lots of six discs each for purposes of further processing and comparative evaluation.

Next, a first solution was prepared by mixing 13.35 liters of a 60 weight percent solution of fluorosilicic acid in 66.65 liters of water to form a solution containing 10 weight percent fluorosilicic acid. This solution was then charged to a first treatment tank.

A second solution was then prepared by mixing 3.2 liters of a 50 weight percent solution of fluoroboric acid in 76.8 liters of water to form a solution containing 2 percent by weight of fluoroboric acid. This solution was then charged to a second treatment tank.

Then the first lot of six discs were mounted in the first tank containing the fluorosilicic acid solution and revolved therein for approximately 3 minutes. These discs were then rinsed with deionized water for 5 minutes and thereafter dried under nitrogen. Also, the second lot of six discs were mounted in the second tank containing the fluoroboric acid solution and revolved therein for a period of approximately 3 minutes. Thereafter these discs were rinsed with deionized water for a period of approximately 5 minutes and then dried under nitrogen.

The third lot of six discs were used as a control and were treated in accordance with the heretofore known and commercially used video disc cleaning process. This commercially used cleaning process includes cleaning the discs with a 5 percent aqueous solution of Shipley 1160B conditioner available from the Shipley Co., which is followed by a rinsing with deionized water and drying in a freon atmosphere. The Shipley 1160B conditioner is an aqueous solution of organic alcohols which is commercially available from the Shipley Co.

Thereafter, a lubricant layer was applied to all video discs of each lot as a 1 percent solution in heptane of the lubricant of the formula:

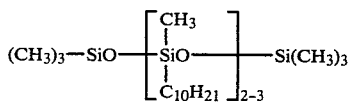

made in accordance with the method described by Wang et al. in the copending applications referred to hereinabove.

Each of the three lots of discs, each containing six discs, was subjected to environmental stress conditions of high temperature and high humidity. In this testing the discs were taken from ambient room temperature conditions and placed into a chamber maintained at 100° F. (37.7° C.) and 90 percent relative humidity and held under these conditions for a period of 196 hours. Thereafter, the discs were transferred to and held for a period of 2 hours at ambient room temperature conditions.

Each of the discs was then played and the carrier distress measured and determined for each disc. It was found that after being subjected to the 196 hours of high temperature, high humidity conditions of stress, the discs of lots 1 and 2, treated respectively with the fluorosilicic acid solution and the fluoroboric acid solution of this invention, had an average carrier distress of 2 seconds in 60 minutes of playback time, while the discs of the third lot, treated in accordance with the heretofore known and commercially used cleaning process, had an average carrier distress of 33 seconds in 60 minutes of playback time. Additionally, it was found that the carrier distress of all discs of lots 1 and 2 (treated in accordance with this invention) did not increase after being subjected to 196 hours of the high temperature and high humidity (100° F.-90 percent RH) conditions.

EXAMPLE II

In this example, three lots of video discs, each containing six discs, were prepared and treated as in Example I.

After lubrication, but prior to exposure to high temperature, high humidity environmental conditions of stress, the carrier distress time was measured and determined for the initial playback of each disc. Then the discs were exposed as before to environmental stress conditions of high temperature, high humidity (100° F. (37.7° C.) and 90 percent RH). The discs were played and the carrier distress time was measured and determined for each disc after an interval of 48 hours and again after a time period of 192 hours of exposure to the high temperature, high humidity conditions. The results obtained in these tests are summarized hereinbelow in Table I.

TABLE I

| Treatment | Carrier Distress - in Sec. per 30 Min. Playback Time | | | | | |
| --- | --- | --- | --- | --- | --- | --- |
| | Initial Play | | After 48 hrs. Stress | | After 192 hrs. Stress | |
| | Average | Range | Average | Range | Average | Range |
| LOT 1 | | | | | | |
| $H_2SiF_6$ - 10 percent solution | 3.1 | 0.2–5 | 0.3 | 0.2–0.7 | 0.8 | 0.1–1.9 |
| LOT 2 | | | | | | |
| $HBF_4$ - 2 percent solution | 2.9 | 0.1–7.5 | 0.4 | 0.1–2.6 | 1.0 | 0.3–4.0 |
| LOT 3 (CONTROL) | | | | | | |
| Shipley 1160B | 0.1 | 0–0.1 | 1.0 | 0.1–2.7 | 17.6 | 0.4–94 |

EXAMPLE III

In this example, a series of video discs were compression molded as in Example I from the molding composition set forth in that example using two different stampers, which are identified as "Stamper A" and "Stamper B" in the following Table II.

After compression molding, the discs were separated into three lots for further processing, testing, and comparison. Each of the lots, identified as "Lot 1", "Lot 2", and "Lot 3" in Table II hereinbelow, contained 48 discs, with 24 discs in each lot being molded from "Stamper A" and 24 discs of each lot being molded from "Stamper B".

The first lot of discs, identified as Lot 1, was given no further processing other than to be lubricated as set forth in Example I. The second lot, Lot 2, was cleaned in accordance with the aqueous cleaning solution disclosed by Datta in the copending application referred to hereinabove. This cleaning solution included 500 parts of 30 percent hydrogen peroxide, 500 parts of 36 percent ammonium hydroxide, and 7 parts by volume of a fluorosurfactant, commercially available as Fluorad FC-93, in 10,000 parts of water. Fluorad FC-93 fluorosurfactant is an ionic, ammonium perfluoroalkylsulfonate commercially available from 3M Company. The discs of Lot 3 were treated by the 10 percent fluorosilicic acid treatment solution of Example I to which a small amount of Fluorad FC-93 surfactant had been added in order to provide good wetting of the irregularly shaped disc surface.

All discs of all three lots were then lubricated as in Example I and thereafter exposed to the high temperature, high relative humidity environmental stress conditions as in Example I. The high temperature, high relative humidity environmental stress conditions were maintained at 100° F. (37.7° C.) and 95 percent relative humidity in this example. All discs were maintained under these conditions of high temperature, high humidity for a first period of 48 hours which was then followed by a second 48-hour period.

The discs were played and carrier distress time was measured and determined for each disc of all lots prior to the exposure to the environmental condition stress test and again after each 48-hour period of stress testing. The results obtained by this testing are summarized below in Table II.

TABLE II

| Treatment | Carrier Distress - in Sec. per 60 Min. Playback Time | | | | | |
|---|---|---|---|---|---|---|
| | Initial Play | | After 48 hrs. Stress | | After 96 hrs. Stress | |
| | Mean | % Pass-3 sec. | Mean | % Pass-3 sec. | Mean | % Pass-3 sec. |
| LOT 1 (CONTROL) (untreated) | | | | | | |
| Stamper A | 2.5 | 60% | 45 | 0% | 55 | 0% |
| Stamper B | 3.8 | 45% | 52 | 0% | 60 | 0% |
| LOT 2 (peroxide-ammonium-surfactant treated) | | | | | | |
| Stamper A | 0.4 | 80% | 5.3 | 25% | 7.7 | 15% |
| Stamper B | 0.2 | 90% | 6.7 | 20% | 9.3 | 10% |
| LOT 3 (H2SiF6 - surfactant treated) | | | | | | |
| Stamper A | 0 | 100% | 1.2 | 65% | 3.1 | 45% |
| Stamper B | 0.1 | 90% | 0.9 | 80% | 2.5 | 60% |

As can be seen by a careful analysis of the above Examples and the data contained therein, the improved disc treatment of this invention, with aqueous solutions of "soft" fluorinating reagents, provides a substantial improvement in the carrier distress of the treated discs after exposure to environmental conditions of high temperature and high relative humidity, when compared to prior known, disclosed, and commercially used treating processes. The fluorinating treatment of high density information discs, such as video discs, by the method of this invention using "soft" fluorinating reagents has been found to be an effective means of lowering the carrier distress and reducing ambient aging of the discs due to migration of hydroscopic materials, and their sensitivity to conditions of high humidity and high temperature.

We claim:

1. In the manufacture of a conductive, high density information disc having video and audio information in the form of geometric variations in an information track which can be reconstituted in electrical signal form with a playback stylus, wherein a conductive plastic is compression molded to form said high density information disc, the improvement which comprises treating the surfaces of said high density information disc with a fluorinating reagent selected from the group consisting of fluorosilicic acid, fluoroboric acid, hydrofluoric acid, and antimony pentafluoride to render said high density information disc substantially resistant to and stable under conditions of high temperature and high relative humidity.

2. A process in accordance with claim 1 wherein said fluorinating reagent is employed as an aqueous solution of fluorosilicic acid.

3. A process in accordance with claim 1 wherein said fluorinating reagent is employed as an aqueous solution of fluoroboric acid.

4. A process in accordance with claim 1 wherein said fluorinating reagent is employed in an aqueous solution in an amount of from about 1 up to about 40 percent by weight based on the total weight of the treating solution.

5. A process in accordance with claim 4 wherein said fluorinating reagent is employed in said aqueous solution in an amount of from about 2 up to about 10 percent by weight based on the total weight of the treating solution.

6. A process in accordance with claim 1 wherein a lubricant is applied to the treated surfaces of said high density information disc.

7. A process in accordance with claim 6 wherein said lubricant has the formula:

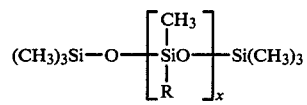

wherein R is an alkyl group of 4–20 carbon atoms and x is an integer.

8. In a method of fabricating a high density information disc replica which comprises dry blending a polyvinylchloride resin with additives including stabilizers, lubricants and flow modifiers, compression molding the resultant blend to form a high density information disc replica, and applying a thin lubricant layer to the surfaces of the disc replica, the improvement which comprises treating the surfaces of said high density information disc replica with a fluorinating reagent selected from the group consisting of fluorosilicic acid, fluoroboric acid, hydrofluoric acid, and antimony pentafluoride to render the same substantially resistant to and stable under conditions of high temperature and high relative humidity, prior to the applying of the lubricant.

9. A method in accordance with claim 8 wherein said treating is carried out by employing an aqueous solution of fluorosilicic acid.

10. A method in accordance with claim 8 wherein said treating is carried out by employing an aqueous solution of fluoroboric acid.

11. A method in accordance with claim 8 wherein said lubricant layer consists essentially of a siloxane of the formula:

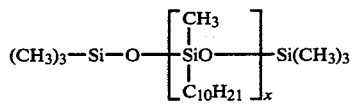

wherein x is an integer of about 2–3.

12. A method in accordance with claim 8 wherein said additives include at least 12 percent by weight of the molding composition of conductive carbon black particles.

13. A method in accordance with claim 8 wherein said treating is carried out by employing an aqueous solution containing from about 1 up to about 40 percent by weight of the fluorinating reagent based on the total weight of the treating solution.

14. A method in accordance with claim 13 wherein said fluorinating reagent is present in said aqueous treating solution in an amount of from about 2 up to about 10 percent by weight based on the total weight of said aqueous solution.

* * * * *